(12) United States Patent
Nakano et al.

(10) Patent No.: US 6,490,416 B1
(45) Date of Patent: Dec. 3, 2002

(54) FOCAL PLANE SHUTTER HAVING SYNCHRONOUS CONTACT MEMBER

(75) Inventors: Yoichi Nakano, Narashino (JP); Akira Ito, Narashino (JP); Miyoshi Tanikawa, Narashino (JP); Chiaki Nemoto, Narashino (JP)

(73) Assignee: Seiko Precision Inc. (JP)

( * ) Notice: Subject to any disclaimer, the term of this patent is extended or adjusted under 35 U.S.C. 154(b) by 0 days.

(21) Appl. No.: 09/854,974

(22) Filed: May 14, 2001

(30) Foreign Application Priority Data

May 12, 2000 (JP) ........................................ 2000-140686

(51) Int. Cl.[7] ................................................ G03B 9/70
(52) U.S. Cl. ........................................ 396/183; 396/195
(58) Field of Search ................................ 396/195, 194, 396/183, 180

(56) References Cited

U.S. PATENT DOCUMENTS 6,253,030 B1 * 6/2001 Miyauchi et al. ............ 396/195

FOREIGN PATENT DOCUMENTS

JP 02001324739 A * 11/2001 ............ G03B/9/70

* cited by examiner

Primary Examiner—W. B. Perkey
(74) Attorney, Agent, or Firm—Adams & Wilks

(57) ABSTRACT

A focal plane shutter for a camera has a synchronous contact member that produces less chattering than conventional synchronous contact members. One end of an opening electromagnet and one end of a closing electromagnet are separately connected to the higher-potential side of a power supply for a CPU in the camera, and the other ends of the electromagnets are grounded. An output circuit has an inverter circuit made up of a transistor and two resistors. A driver voltage for energizing the closing electromagnet is applied to the base of the transistor via a first resistor. The collector of the transistor is connected to the higher-potential side of the power supply via a second resistor. The emitter of the transistor is connected to the lower-potential side of the power supply. First and second voltage signals are produced from an output terminal on the side of the collector. One end of the synchronous contact member is connected to the lower-potential side of the power supply and the other end thereof is connected to the base of the transistor.

14 Claims, 6 Drawing Sheets

FOCAL PLANE SHUTTER HAVING SYNCHRONOUS CONTACT MEMBER

BACKGROUND OF THE INVENTION

1. Field of the Invention

The present invention relates generally to a shutter for use in a camera and, more particularly, to a camera shutter having exposure control means that performs an opening operation by an opening sector and a closing operation by a closing sector.

2. Description of the Related Art

A shutter that controls exposure by an opening sector and a closing sector has opening and closing levers for performing opening and closing operations, respectively. The opening and closing levers are spring-biased in opening and closing directions and are held in their charged condition by electromagnets. The electromagnets are deenergized whereby the opening and closing levers are driven by the stored spring forces to perform opening and closing operations. Exposure is controlled by varying the timing at which the opening and closing electromagnets are deenergized. A synchronous contact member for producing a trigger signal for a strobe is mounted near the position at which the operation of the opening lever ends. The opening lever fully opens the opening sector and simultaneously therewith, the synchronous contact member is energized to produce the trigger signal to cause the strobe to flash.

One known structure is shown in FIG. 6, where a shutter base plate 1 is provided with a shutter opening 1c. An opening lever 21 is rotatably fitted over a shaft 1a standing on the shutter base plate 1. The opening lever 21 is biased in a counterclockwise direction by an opening spring (not shown). Similarly, a closing lever 22 is rotatably fitted over a shaft 1b on the shutter base plate 1, and the closing lever 22 is biased in a counterclockwise direction by a closing spring (not shown). The opening lever 21 and the closing lever 22 have protrusions 21b and 22b at their respective front ends. The protrusions 21b and 22b pass through arc-shaped holes 1e and 1f, respectively, formed in the shutter base plate 1, and the protrusions protrude below the shutter base plate 1. An opening sector and a closing sector (neither of which is shown) are driven by the opening lever 21 and the closing lever 22, respectively, to open and close the shutter opening 1c.

A charge lever 30 is rotatably fitted over a shaft 1d on the shutter base plate 1. The opening lever 21 and the closing lever 22 are placed into a charged position by the charge lever 30. The motion of the opening lever 21 and the closing lever 22 is controlled by an opening electromagnet 41 and a closing electromagnet 42 under control of a CPU (not shown) incorporated in the camera. A printed circuit board 60 is supported on the top ends of the shafts 1a and 1b standing on the shutter base plate 1. The opening electromagnet 41 and the closing electromagnet 42 are soldered to circuits on the printed circuit board 60 and electrically connected with these circuits. opening contact members 151a, 151b and closing contact members 152a, 152b are crimped to the printed circuit board 60.

FIG. 5 shows portions for activating and deactivating the opening contact members 151a and 151b of a shutter similar to the shutter of FIG. 6. Note that elements or components performing like functions are indicated by like reference numerals in both FIGS. 5 and 6. Each of the opening contact members 151a and 151b is fabricated by bending a metal leaf spring in a complex manner to crease the spring. In the state of FIG. 5, the opening sector has been displaced into the charged position, thus closing the shutter opening 1c. Under this condition, the opening sector is attracted and held by the opening electromagnet 41. At this time, the opening contact members 151a and 151b are opened. When the shutter opening 1c is opened, the opening lever 21 is released from the opening electromagnet 41 and rotated by the opening spring in a counterclockwise direction. A pin 21a mounted on the opening lever 21 is pushed against the opening contact member 151a near the position at which the counterclockwise travel of the opening lever 21 ends. The opening contact member 151a is thereby pushed against the opening contact member 151b, closing both contact members. Thus, both contact members are electrically connected with each other. In this structure, if the shutter opening 1c is not fully opened by the opening sector, an opening signal indicating opening of the contact members is produced. If the shutter opening is fully opened by the opening sector, a closure signal is produced. Since the closing contact members 152a and 152b are substantially identical in structure with the opening contact members 151a and 151b, a description thereof has been omitted.

In this way, in the prior art structure, when the shutter opening 1c is opened by the opening sector, the opening contact members 151a and 151b are closed and electrically connected together. When the shutter opening 1c is closed by the closing sector, the closing contact members 152a and 152b are closed and electrically connected. Therefore, immediately after the contact members are closed, chattering tends to occur because of the resilience of the contact members. In the case where the opening contact members 151a and 151b are fabricated as synchronous contact members and an electric signal is used to trigger flash of the strobe, the chattering may produce a false trigger signal for flash of the strobe. As a result, the strobe may erroneously flash. Furthermore, each of the contact members 151a, 151b, 152a, and 152b is fabricated by bending a metal leaf spring in a complex manner to crease the spring, which increases the fabrication cost. Another problem is that there are a large number of input and output terminals between the CPU in the camera and the driver circuit of the shutter, which complicates assembly.

SUMMARY OF THE INVENTION

Accordingly, it is an object of the present invention to provide a focal plane shutter which uses a synchronous contact member thereby resulting in a decreased amount of chattering.

Another object of the present invention is to provide a focal plane shutter having a synchronous contact member which is easy and inexpensive to fabricate and assemble in the shutter.

A further object of the present invention is to provide a focal plane shutter having a synchronous contact member and which has a reduced number of input and output terminals.

Another object of the present invention is to provide a focal plane shutter having a synchronous contact member which produces an output signal used as a trigger signal for flashing a strobe thereby securing generality of use and design.

A focal plane shutter in accordance with the present invention has a shutter base plate provided with a shutter opening, an opening sector for opening the shutter opening, a closing sector for closing the shutter opening, and a normally closed synchronous contact member linking the opening sector and an output circuit. When the shutter opening is opened, the synchronous contact member is opened. The output circuit produces an opening signal when the synchronous contact member is closed. When the synchronous contact member is opened, the output circuit produces a given output signal different from the opening signal. Since the synchronous contact member, which is normally closed, is opened when the shutter opening is opened, the amount of chattering is reduced. The shutter can be assembled and inspected in a shorter time. Misflash of the strobe can be prevented. Furthermore, because an opening signal is produced when the synchronous contact member is closed, and because a given signal different from the opening signal is produced when the synchronous contact member is opened, a signal corresponding to the degree to which the shutter opening is opened by the opening sector can be obtained thereby securing generality of design.

In accordance with the invention, the focal plane shutter includes a closing electromagnet for controlling the time when the closing sector starts to operate. The output circuit includes a transistor and a first resistor. A driver voltage for the closing electromagnet is applied to the base of the transistor via the first resistor. The collector of the transistor is connected with a higher-potential side of a power supply via a second resistor. The emitter of the transistor is connected with a lower-potential side of the power supply. First and second voltage signals are produced from the collector of the transistor. One end of the synchronous contact member is connected to the lower-potential side of the power supply, the other end being connected to the base of the transistor. In addition, energy saving can be accomplished, because an electric current flows through only the synchronous contact member when a driver voltage is applied to the closing electromagnet. Additionally, the closing electromagnet and the transistor can be controlled with the same voltage signal, because the driver voltage for the closing electromagnet is applied to the base of the transistor. Terminals can be shared between the focal plane shutter and the CPU in the camera, thereby reducing the number of terminals which would otherwise be needed.

The synchronous contact member is comprised of a linear spring and a pin. Therefore, it is easy to fabricate the synchronous contact member at low cost.

Other objects, features and advantages of the invention will become apparent to those ordinarily skilled in the art from a reading of the following detailed description thereof when read in conjunction with the accompanying drawings.

DETAILED DESCRIPTION OF THE PREFERRED EMBODIMENTS

Figure 6:
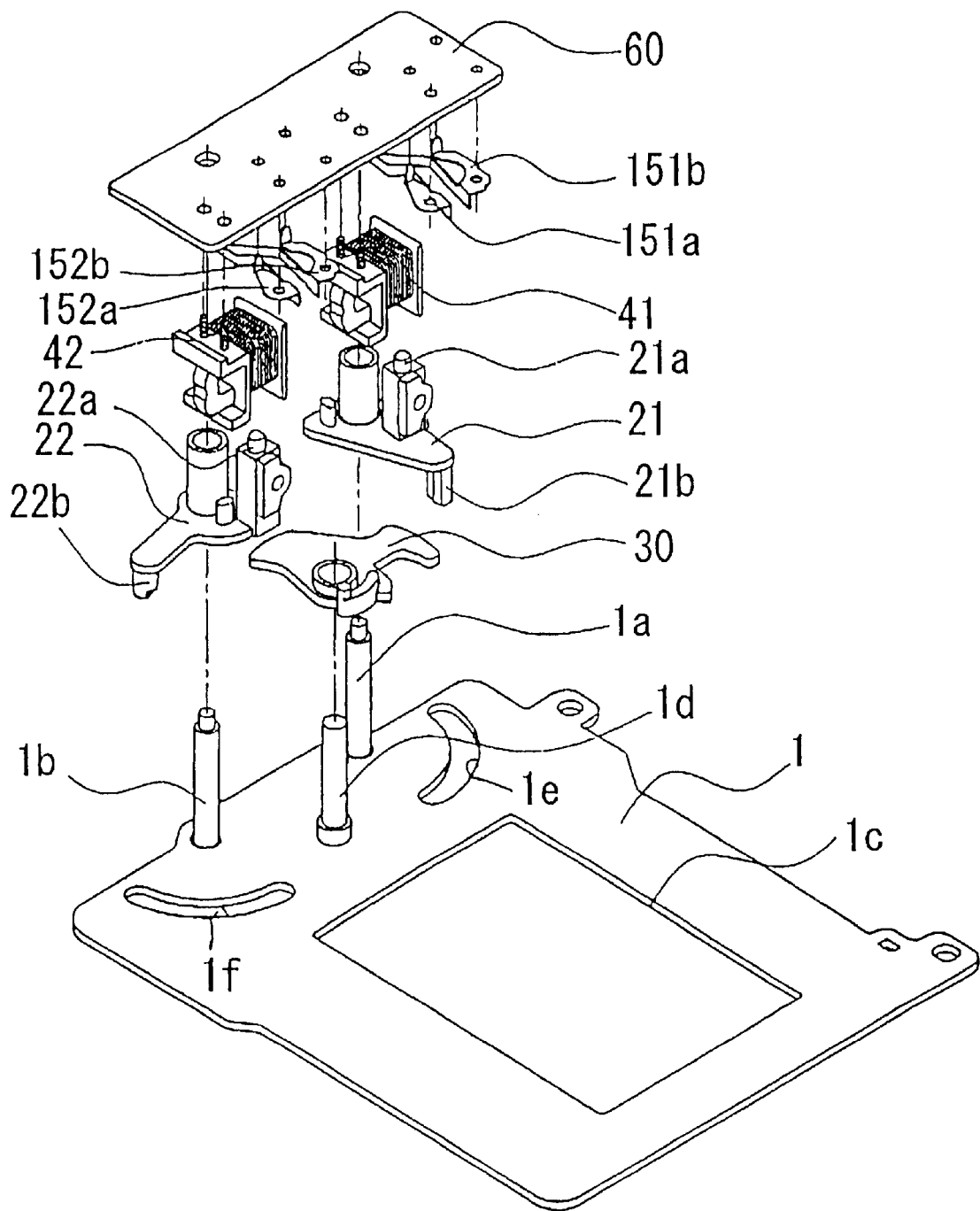
FIG. 6 is a perspective view of the prior art shutter drive mechanism.

A focal plane shutter embodying the present invention is similar to the focal plane shutter of the mechanism already described in connection with FIG. 6 except for the construction of the opening contact members 151a, 151b and the closing contact members 152a, 152b. In the following description, elements or components that are the same as these described with reference to the prior art structure of FIG. 6 will be described using the same reference numerals as in the description of the prior art structure of FIG. 6.

Figure 3:
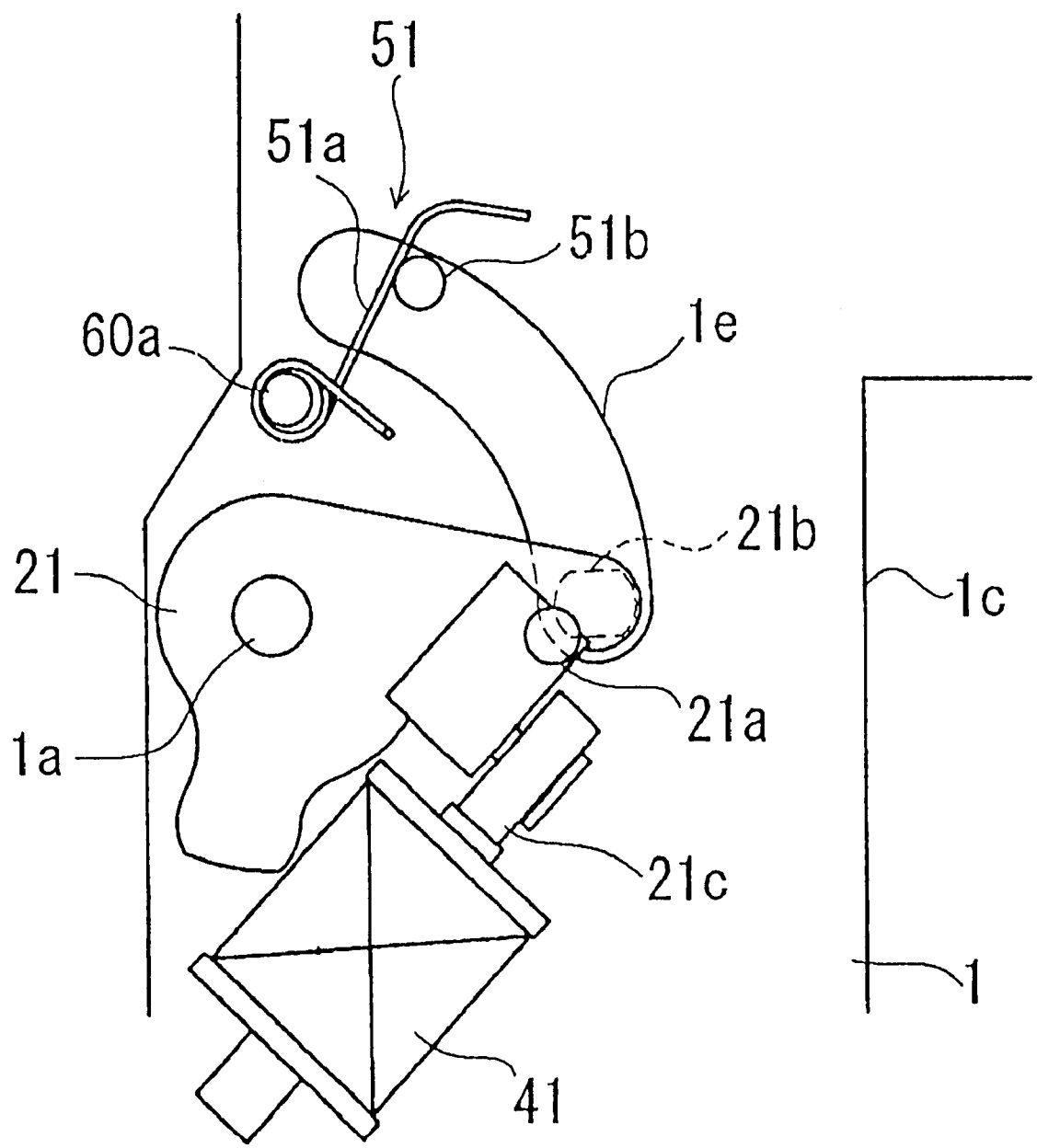
FIG. 3 is an enlarged plan view showing the closed state of the synchronous contact member shown diagrammatically in FIG. 1.
Figure 4:
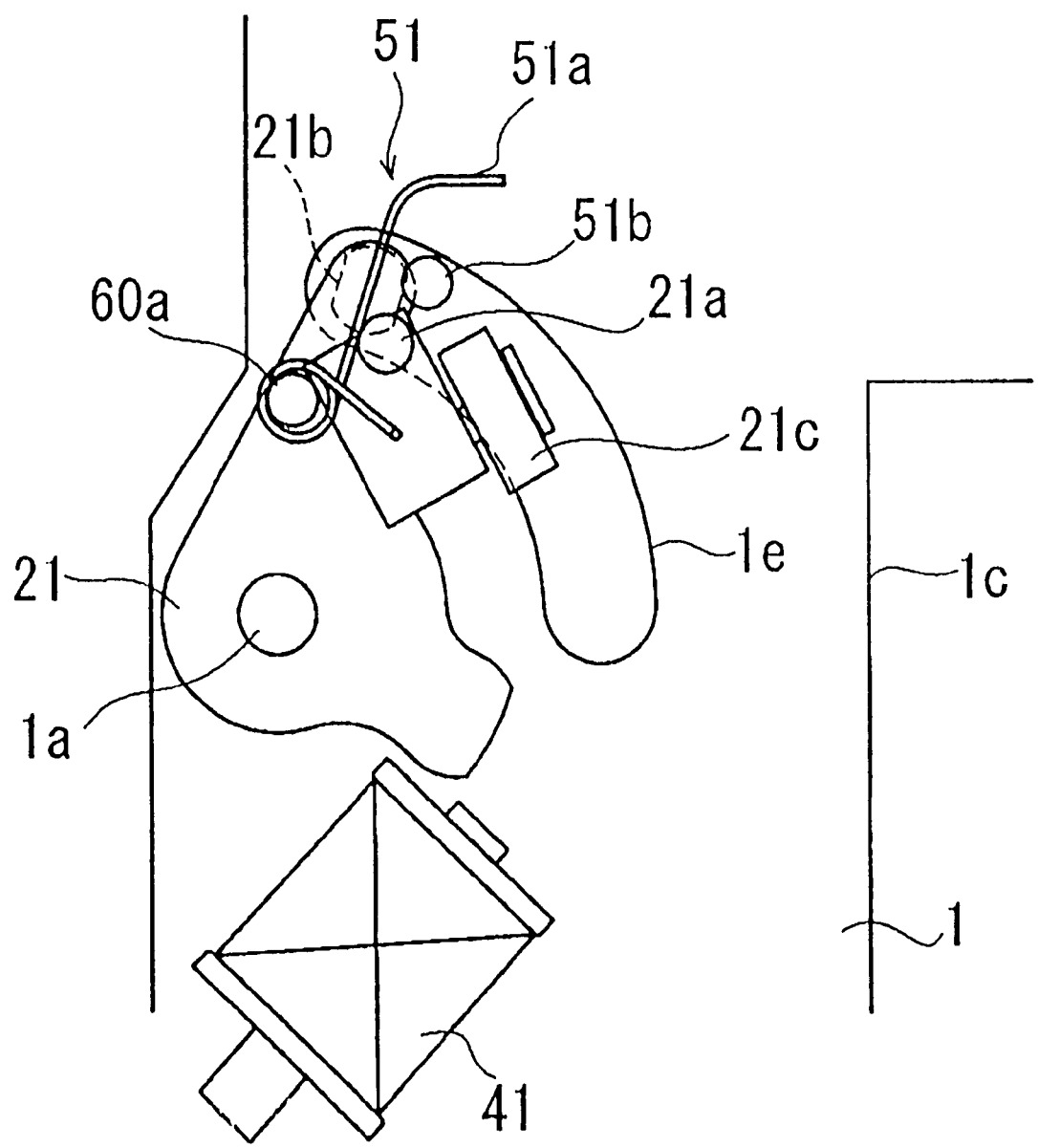
FIG. 4 is a view similar to FIG. 3, but showing the open state of the synchronous contact member.
Figure 5:
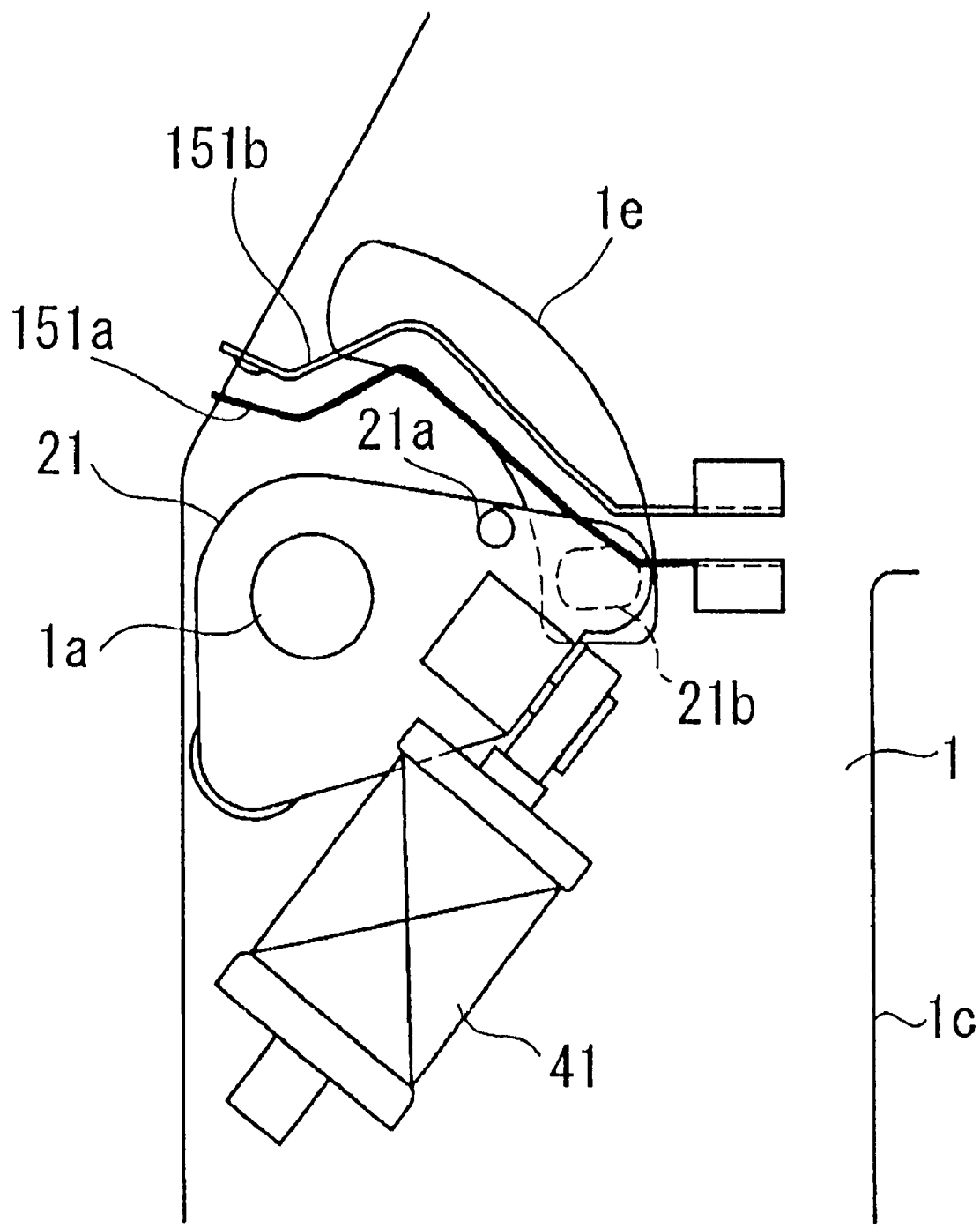
FIG. 5 is an enlarged plan view of the prior art synchronous contact members.

Referring to FIGS. 3 and 4, a synchronous contact member 51 in accordance with the invention comprises a switch having two switch contacts in the form of a movable linear spring 51a and a fixed pin 51b both made of electrically conductive material. The linear spring 51a is wound at one end around a mounting pin 60a protruding from the printed circuit board 60. The other end of the linear spring 51a is configured and disposed to be brought into contact with the fixed pin 51b protruding from the printed circuit board 60, whereby the synchronous contact member can be opened and closed. A magnetic member 21c is mounted on the opening lever 21 and is magnetically attracted to the opening electromagnet 41 when the electromagnet is engerized. A pin 21a is formed on the lever 21 to push the spring 51a out of contact with the pin 51b in response to counterclockwise movement of the lever 21, as shown in FIG. 4.

Figure 1:
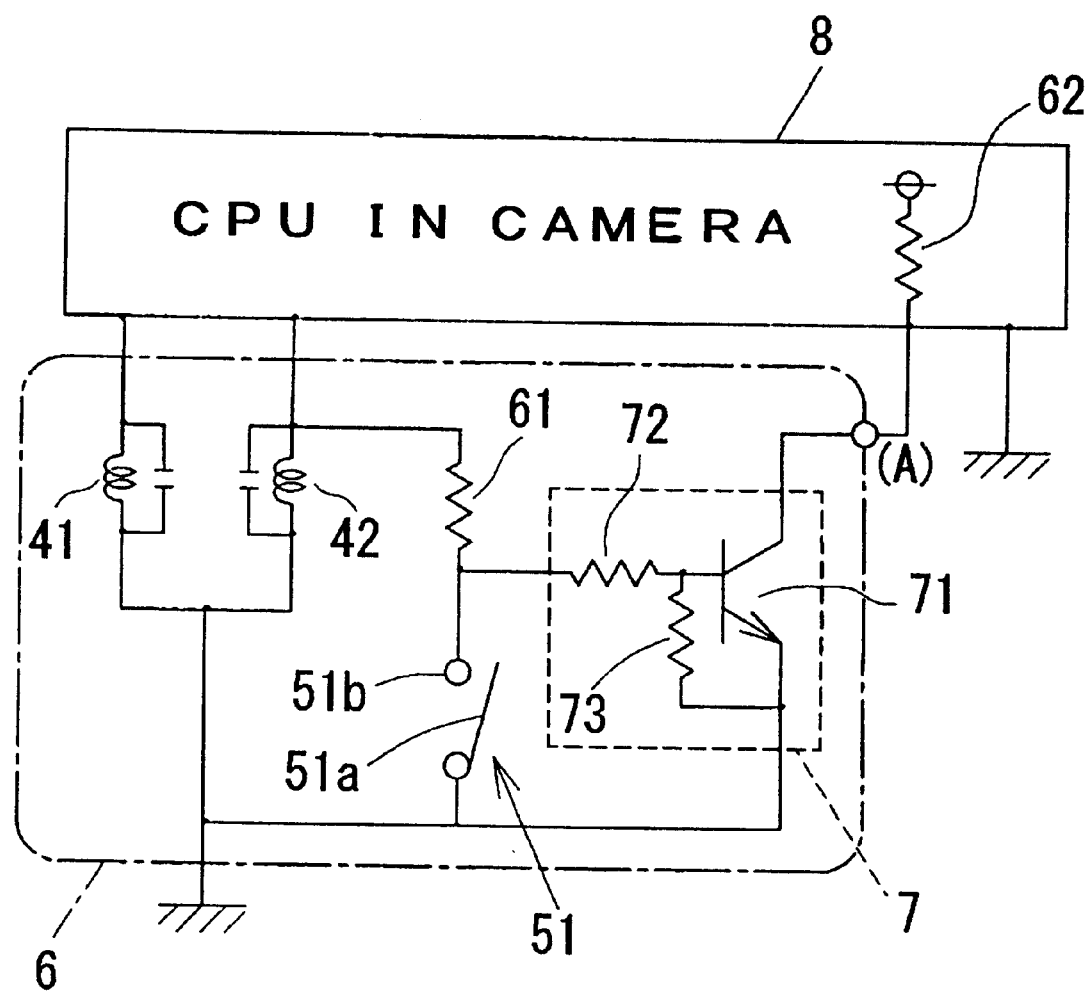
FIG. 1 is a diagram of an output circuit used in a focal plane shutter in accordance with the present invention.

FIG. 1 shows the output circuit 6 of the shutter. The opening electromagnet 41 and the closing electromagnet 42 are connected separately at one of their ends to the higher-potential side of the power supply of the CPU 8 in the camera and connected at their other ends to the lower-potential side of the power supply, for example, ground potential. The output circuit 6 has an inverter circuit 7 comprised of a transistor 71 and two resistors 72, 73. As shown, the driver voltage for engergizing the closing electromagnet 42 is applied to the base of the transistor 71 via a first resistor 61 and the resistor 72. The collector of the transistor 71 is connected to the higher-potential side of the power supply of the CPU 8 via a second resistor 62. The emitter of the transistor 71 is connected to the lower-potential side of the power supply. An opening signal and a given signal are produced from the output terminal (A) on the collector side of the transistor 71. One end of the synchronous contact member 51 is connected to the lower-potential side of the power supply and the other end thereof is connected to the base of the transistor 71. As shown in FIG. 1, the base of the transistor 71 is connected to a junction point between the resistor 61 and the fixed pin 51b of the switch 51.

Figure 2:
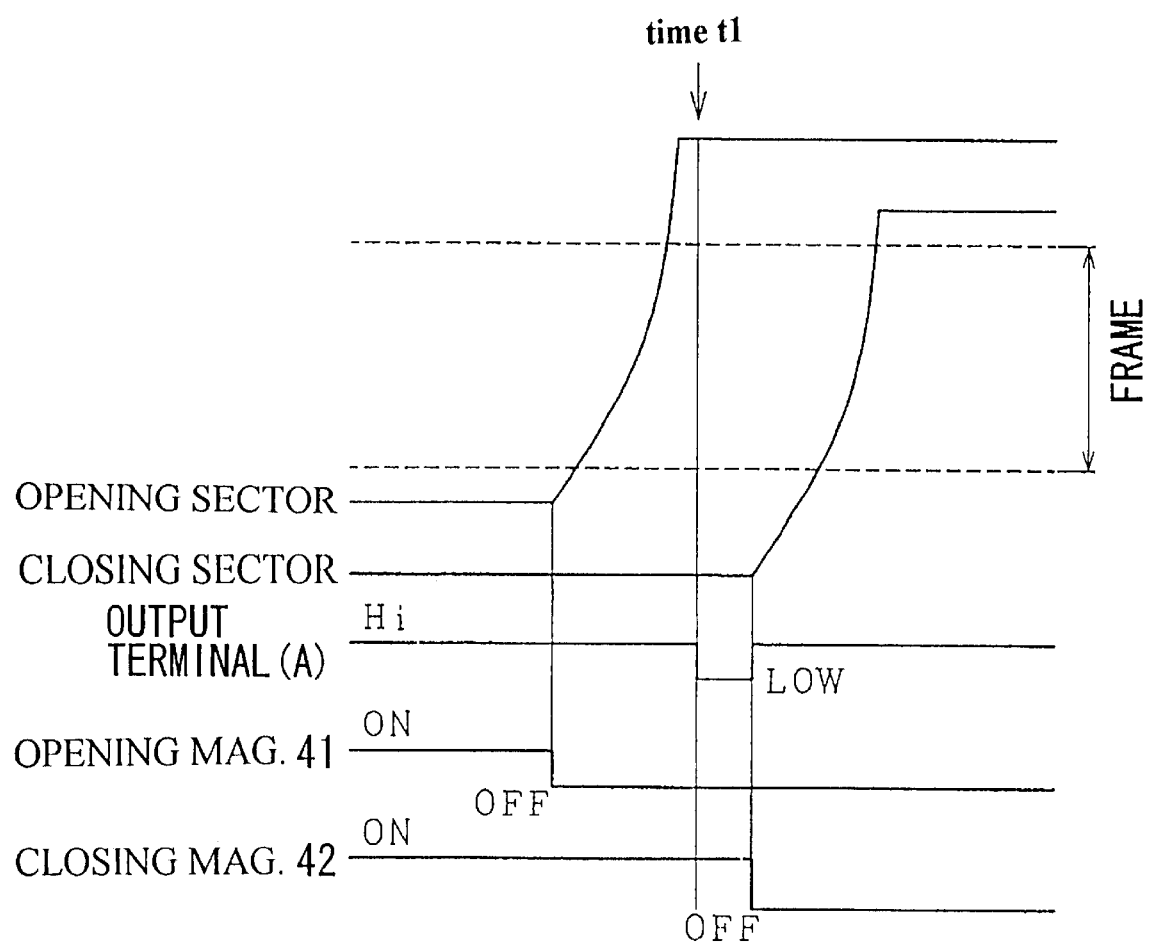
FIG. 2 is a timing diagram illustrating a sequence of operations performed by the focal plane shutter operated in conjunction with the output circuit shown in FIG. 1.

The operation of the focal plane shutter will now be described with reference to FIGS. 2–4. FIG. 3 shows a state in which the opening and closing levers 21 and 22 have been moved into the charged position by the charge mechanism (not shown) of the camera. The opening lever 21 is rotated in a clockwise direction so that the opening sector (not shown) closes the shutter opening 1c. At this time, the closing sector (not shown) is retracted from the shutter opening 1c. In this stated, as shown in FIG. 2, a driver voltage is applied to the opening electromagnet 41, thus energizing the electromagnet so that the magnetic member 21c on the opening lever 21 is magnetically attracted and held to the opening electromagnet 41. The synchronous contact member 51 is urged into resilient contact with the pin 51b by the spring force of the spring 51a thereby closing the synchronous contact member 51. This is the normally closed stated shown in FIG. 3. As also shown in FIG. 2, the driver voltage is applied to the closing electromagnet 42, thus energizing the electromagnet to maintain the closing sector retracted from the shutter opening 1c. In the output circuit 6 of FIG. 1, when the synchronous contact member or switch 51 is closed, the driver voltage for the closing electromagnet 42 is not applied to the base of the transistor 71 and thus the transistor remains OFF, even if a voltage is applied to the closing electromagnet 42. Therefore, the higher-potential side of the power supply appears as a high voltage signal at the output terminal (A), and this high voltage signal constitutes the opening signal produced at the output terminal (A).

FIG. 4 shows a state in which the synchronous contact member 51 is opened. In this state, when the driver voltage for the opening electromagnet 41 is cut off, the magnetic body 21c is released and the opening spring (not shown) rotates the opening lever 21 in a counterclockwise direction, whereby the opening sector gradually opens the shutter opening 1c. As the lever approaches the end of its counterclockwise movement, i.e., the position at which the operation ends, the pin 21a comes into contact with the spring 51a and pushes the spring 51a away from the pin 51b, thus opening the synchronous contact member 51. As can be seen from FIG. 1, the driver voltage for the closing electromagnet 42 is applied to the base of the transistor 71 when the synchronous contact member 51 is opened. Consequently, the transistor 71 is turned ON and made conductive so that current flows through the collector-emitter path thereof thereby lowering the voltage at the output terminal (A). Thus when the transistor 71 is turned ON, a lower voltage signal is produced at the output terminal (A) and such constitutes the aforementioned given signal produced at the output terminal (A). This given signal is lower in magnitude than the opening signal.

The voltage signal drops from a first voltage signal (opening signal) to a second voltage signal (given signal), creating a falling signal at time t1 which is used as a trigger signal for controlling the strobe flash. This falling signal is also used as a signal for detecting the completion of the opening movement of the opening sector.

When a given exposure time ends, the driver voltage for energizing the closing electromagnet 42 is cut off. A closing spring (not shown) rotates the closing sector, thereby closing the shutter opening 1c. When photography ends and the driver voltage for the closing electromagnet 42 is cut off, the transistor 71 is turned OFF whereupon the output from the output terminal (A) becomes a high voltage signal.

The inverter circuit 7 is included in the output circuit 6 of the shutter in the FIG. 1 embodiment. The inverter circuit may, however, be placed on the CPU 8 on the side of the camera. The lower-potential side or ground for the synchronous contact member 51 is taken from the ground for the opening and closing electromagnets 41 and 42 in the FIG. 1 embodiment. Instead, the lower-potential side may be taken from the ground for the CPU 8 on the camera side.

Though the invention has been described with reference to a focal plane shutter having an opening sector and a closing sector, it is understood that the invention is also applicable to shutters having plural opening and closing sectors.

As described thus far, in the present invention, the synchronous contact member is normally closed and is opened when the shutter opening is opened. This significantly reduces the amount of chattering. Assembly and inspection can be performed more quickly. Furthermore, misflash of the strobe can be prevented. When the synchronous contact member is closed, an opening signal is produced at an output terminal. When the synchronous contact member is opened, a given signal different from the opening signal is produced at the output terminal. The same signal as used in the past is obtained as a signal corresponding to the degree to which the shutter opening is opened by the opening sector. Consequently, excellent generality is offered. If the synchronous contact member is designed to be normally closed, the synchronous contact member is energized only when a driver voltage is applied to the closing electromagnet. As a result, energy savings can be accomplished. Furthermore, the closing electromagnet and the transistor can be controlled with the same voltage signal, because the driver voltage for the closing electromagnet is applied to the base of the transistor. The terminals can be shared between the focal plane shutter and the CPU in the camera. As a consequence, the number of terminals can be reduced. Moreover, it is easy to fabricate the synchronous contact member thereby reducing the manufacturing cost.

What is claimed is:

1. A focal plane shutter having a shutter base plate provided with a shutter opening, an opening sector for opening the shutter opening, and a closing sector for closing the shutter opening, the focal plane shutter comprising:
    an electromagnet operative when energized by a driver voltage to prevent the closing sector from starting to close the shutter opening;
    a normally closed switch linked to the opening sector and being opened when the shutter opening is opened, the switch having a first end connected to a low potential side of a power supply and a second end;
    a resistor connected between the electromagnet and the second end of the switch for providing the driver voltage to the switch; and
    an output circuit for producing an opening signal when a junction point between the resistor and the second end of the switch is at a low potential and for producing a given signal different from the opening signal when the junction point is at a high potential.

2. A focal plane camera according to claim 1; wherein the output circuit has a transistor having a base connected to the junction point, a collector connected to a high potential side of the power supply via a second resistor, and an emitter connected to the low potential side of the power supply, wherein the opening signal and the given signal are produced at the collector the transistor.

3. A focal plane shutter according to claim 2; wherein the switch comprises an electrically conductive movable spring and an electrically conductive fixed pin.

4. A focal plane shutter according to claim 1; wherein the switch comprises an electrically conductive movable spring and an electrically conductive fixed pin.

5. In a shutter having a shutter base plate having a shutter opening, an opening sector for opening the shutter opening, and a closing sector for closing the shutter opening: an electromagnet operative when engerzized by a driver voltage to prevent the closing sector from starting to close the shutter opening; a normally closed switch linked to the opening sector so that the switch is opened when the opening sector opens the shutter opening, the switch having a movable contact connected to a low potential side of a power supply and a fixed contact; a resistor connected between the electromagnet and the fixed contact of the switch for applying the driver voltage to the switch; and an output circuit connected to a junction point between the resistor and the fixed contact of the switch for producing a first signal when the switch is closed and the junction point is at a low potential and producing a second signal different from the first signal when the switch is open and the junction point is at a high potential.

6. A shutter according to claim 5; wherein the output circuit includes a transistor having a base connected to the junction point, a collector connected through a terminal to a high potential side of the power supply, and an emitter connected to the low potential side of the power supply, wherein the first and second signals are produced at the terminal.

7. A shutter according to claim 6; wherein a changing signal appearing at the terminal as the first signal changes to the second signal when the switch opens constitutes a trigger signal for triggering flash of a strobe.

8. A shutter according to claim 6; wherein a changing signal appearing at the terminal as the first signal changes to the second signal when the switch opens constitutes a detection signal for detecting the open state of the shutter opening.

9. A shutter according to claim 6; wherein the fixed contact comprises an electrically conductive pin and the movable contact comprises an electrically conductive spring.

10. A shutter according to claim 9; wherein the electrically conductive spring comprises a linear spring having one end thereof wound around an electrically conductive pin and another end thereof engagable with the fixed contact.

11. A shutter according to claim 5; wherein a changing signal appearing at the terminal as the first signal changes to the second signal when the switch opens constitutes a trigger signal for triggering flash of a strobe.

12. A shutter according to claim 5; wherein a changing signal appearing at the terminal as the first signal changes to the second signal when the switch opens constitutes a detection signal for detecting the open state of the shutter opening.

13. A shutter according to claim 5; wherein the fixed contact comprises an electrically conductive pin and the movable contact comprises an electrically conductive spring.

14. A shutter according to claim 13; wherein the electrically conductive spring comprises a linear spring having one end thereof wound around an electrically conductive pin and another end thereof engagable with the fixed contact.

* * * * *